United States Patent Office 3,438,789
Patented Apr. 15, 1969

3,438,789
LUBRICANT COATING FOR FRICTION SURFACES AND PROCESS FOR PRODUCING SAME
Franz Weiss and Hermann Bauer, Neckarsulm, Germany, assignors to Karl Schmidt G.m.b.H., Neckarsulm, Germany, a corporation of Germany
Filed Feb. 16, 1965, Ser. No. 432,969
Claims priority, application Germany, Feb. 27, 1964, Sch 34,715
Int. Cl. F16j *1/02;* F16c *1/24, 33/00*
U.S. Cl. 92—172             6 Claims

ABSTRACT OF THE DISCLOSURE

There are disclosed lubricant coatings for friction surfaces which are microporous and capable of serving as a liquid lubricant reservoir and a method of making such coatings. Thus an object such as a piston or bearing is plated with a metal coating, the metal coating is thereafter anodized to form an adherent pulverulent microporous layer and then a liquid lubricant is dispersed in the microporous layer. According to the invention, the plating layer, as well as the pulverulent layer, are rendered microporous, thereby providing an increased lubricant reservoir for liquid lubricant.

---

This invention relates in general to the art of lubricating friction surfaces, and more particularly to a lubricant coating for friction surfaces on objects such as bearings, pistons, etc., and a process for producing such lubricant coated friction surfaces.

In its simplest form, the lubricant coating of the instant invention comprises a layer of pulverulent compound adherent to the friction surface of an object, or to a metal plating layer which is adherent to said friction surface. This pulverulent compound layer is produced on objects having metal friction surfaces by direct anodization, and in the case of metal plated friction surfaces, by anodization of the plating layer. For example, in the case of an aluminum alloy bearing, the friction surface of the bearing is anodized to form an adherent pulverulent layer of an aluminum compound, such as aluminum oxide. This pulverulent layer is of itself powdery and microporous, so as to have lubricating properties.

These lubricating properties can be further enhanced by applying a liquid containing a lubricant such as oil, either alone or in admixture with molybdenum disulfide to the pulverulent layer so that the lubricant and/or molybdenum disulfide penetrates the micropores of said layer to provide a lubricant reservoir within the layer.

A similar lubricant coating can be provided on the friction surfaces of objects by plating them either electrically or chemically with a metal layer, and anodizing the metal plating layer to form an adherent pulverulent compound layer. In this case, the pulverulent layer will contain a compound of the plating metal, and for plating metals such as lead, cadmium and tin, the pulverulent compound layer resulting from anodizing has been found to have excellent lubricating properties in itself.

As in the case of metal friction surfaces directly anodized, the lubricating properties of plated friction surfaces with adherent pulverulent layers can be enhanced by applying a liquid containing a lubricant alone, or in admixture with molybdenum disulfide.

Where plated friction surfaces are anodized according to the invention, the plating layer as well as the pulverulent layer becomes microporous, thus providing an increased lubricant reservoir for liquid lubricant impregnation.

While it is generally known in the electroplating and anodizing art that the surfaces of plated objects can be smoothed by briefly reversing the electroplating polarity so as to anodize the plating layer, this anodizing treatment is usually performed at the conclusion of the plating operation so as to remove any spurs which project from the plating.

With the lubricant coating and process according to the invention it has been found that not only has the plating surface been smoothed, but also that alloy components from said plating surface have dissolved out therefrom producing microporous depressions.

Furthermore, finally pulverulent precipitates have formed on the plated workpieces, having a certain adhesion thereto. If these micropores are filled with a lubricant, such as oil, molybdenum disulfide or a metallic lubricant, for example by impregnation, rubbing in, spraying on, etc., they provide lubricant reservoirs which aid in the running-in of the friction surfaces.

On the other hand, however, the microporous pulverulent precipitate formed on the plated surface by anodization is also in many cases an ideal lubricant of itself, as for example when it contains a compound of a substance such as lead, tin or cadmium which have inherent lubricating properties.

A further substantial improvement in lubricating effect is produced in this connection by impregnating the precipitate with oil, to provide a friction surface, such as for example a friction bearing, that can be run under the most severe conditions at full load as soon as it is installed.

In the case of finely pulverulent coatings which have been produced by anodization, not from direct lubricating metals, such as lead, tin, etc., but from aluminum and its alloys, it has been found that, after a very brief and severe run-in period friction surfaces having outstanding lubricant qualities result, especially when such friction surfaces have been mounted with a very snug fit. The coating in this case works as a fine lapping medium. After a brief run-in period, it is washed out by the normal oil lubrication.

The best lubricant coating results were obtained with anodizing by polarity reversal with a polarity reversal time of 40 seconds approximately with a current density of 3 amperes per square decimeter and a voltage of approximately 4 volts. In producing a lubricant coating on a given friction surface, these values can be varied somewhat according to the properties of the metal surface. Also, the electrolyte medium in which the polarity reversal is performed will be governed by the metal or alloy to be treated.

In applying lubricant-containing liquids to the microporous pulverulent and plating layers, it is not necessary to heat them to remove the lubricant solvent and any water which might be present from the electrolyte bath or prior treatments.

Lubricant impregnation of these microporous layers on friction surface parts can be simply accomplished according to the invention by applying a liquid containing a lubricant and a dewatering agent to the porous layers by any conventional method such as immersion, dipping, or spraying, and allowing them to dry in air until the solvent liquid and dewatering agent have evaporated, leaving only the lubricant dispersed in the micropores.

This is an advance over the treatment processes used in prior art electroplating, since in such processes the plated workpieces were cleansed of electrolyte by hot water, which provided some heating for drying after removal from the hot water, and the workpieces were further dried in a circulating air oven, or with compressed air.

Thus, with a single, simple treatment procedure the drying of the workpieces, the filling of the micropores with oil and the impregnation of the pulverulent layer or lapping medium with oil can be accomplished.

The following examples serve to explain the invention:

EXAMPLE I

A piston which has been coated with lead by an electroplating or chemical process is connected, at the conclusion of this process to the positive pole of a direct current source of approximately 4 volts for 40 seconds at 3 amperes per square decimeter, while the lead electrodes constitute the negative pole. The treatment can be performed in the same bath fluid as the lead coating itself. After this process, the lead coating is covered with micropores and the entire piston is covered with a grainy precipitate of the lead compound. The piston is then immersed into a dewatering fluid in admixture with oil. After about one minute of immersion all of the water from the bath has been driven off, and the piston is withdrawn and left to dry in air. After about 20 minutes of air drying the solvent has evaporated, and the micropores of the lead coating and the grainy precipitate compound adhering thereto are impregnated with oil. A piston so treated will be capable of immediately tolerating the severest loads, since it is self-lubricating due to the oil-impregnated lead compound and the reserve of lubricant in the oil-impregnated micropores of the lead coating.

EXAMPLE II

An aluminum bearing with an approximate alloy composition of about 5% zinc, 1% lead and the remainder aluminum, is connected to a direct current source as in the preceding example. The medium in which the process is performed is dilute sulphuric acid at a temperature of 45±5° C. As in the first example, micropores form and a powdery coating which is dried by the oily dewatering fluid with a bed of molybdenum disulphide added results. After the solvent is evaporated away, the friction surface of the bearing is filled with oil in the micropores, and the powdery coating, a very fine aluminum oxide has had some molybdenum disulphide added to it and is impregnated with oil. As in the preceding example, the micropores serve as lubricant reservoirs, while the powdery, oil-impregnated coating, with molybdenum disulphide added, is a fine lapping medium.

Thus, as can be seen from the foregoing examples, a specifically controlled anodization process is used to produce the lubricant coatings of the instant invention, as distinguished from conventional anodizing processes.

It is therefore, an object of the invention to provide a lubricant coating for friction surfaces which can be produced by anodization.

Another object of the invention is to provide a lubricant coating as aforesaid which is microporous and capable of serving as a liquid lubricant reservoir.

Still another and further object of the invention is to provide a simple, effective process for producing the aforesaid lubricant coatings on friction surfaces.

Other and further objects and advantages of the invention will appear in or become evident from the following detailed description and accompanying drawing in which.

Figure 1:
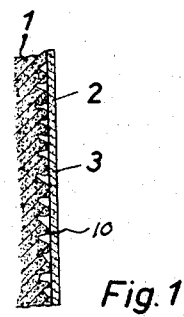
FIG. 1 is a section through a portion of a workpiece friction surface that has been directly anodized to provide a lubricant coating according to one embodiment of the invention.

Referring now to FIG. 1, which shows a metal workpiece 1 which has been subjected to anodization at a voltage of approximately 4 volts, with a current density of approximately 3 amperes per square decimeter, for a period of less than one minute, and preferably 40 seconds approximately. This anodization can be performed in an electrolyte bath, but with the workpiece being connected to the positive pole of a direct current source rather than to the negative pole thereof as in electroplating.

As a result of the aforesaid anodizing, micropores 2 (greatly exaggerated in size) are produced in the workpiece 1 in the region adjacent to its exterior surface 10, as well as in a pulverulent compound coating 3 adherent to said surface 10.

The coating 3, because of its pulverulent powdery nature, can serve as a lubricant itself, and its lubricating properties can be enhanced by impregnating it with oil. Also, the coating 3 can function as a lapping agent to aid in the running-in of the workpiece 1, such as in the case of workpieces 1 which are bearings or pistons. The workpiece 1 can be an aluminum alloy, as described in the foregoing Example II, or can be any other suitable metal or alloy.

Figure 2:
FIG. 2 is a section through a portion of a workpiece friction surface that has been metal-plated and anodized to provide a lubricant coating according to another embodiment of the invention.

In the embodiment of the invention exemplified by FIG. 2, the workpiece 1 is provided with a metal plating layer 4, such as lead, by either electroplating or chemical plating, or any other suitable conventional process. The plated workpiece 1 is subjected to anodization as in the case of the embodiment described in connection with FIG. 1, to produce micropores 5 in the plating layer 4, and throughout the pulverulent compound layer 6 adherent thereto. The coating layer 6, since it is produced by polarity reversal to anodize the plating layer surface, will contain a compound of the plating metal, which in the case of a lead plating layer 4 would be a lead compound. This coating layer 6, because of its pulverulent nature provides lubricating properties in or of itself.

The lubricant coatings 3 and 6 of FIGS. 1 and 2 respectively can be impregnated with a liquid lubricant such as oil, or molybdenum disulphide, or a mixture thereof to improve their lubricating properties. This may be easily accomplished by applying a liquid containing a dewatering agent, and an oil and also molybdenum disulphide, if desired, to said coatings 3 and 6 by any conventional process such as immersion dipping, brushing, spraying, etc., and allowing said coatings 3 and 6 to dry in air until the dewatering agent and other solvent components of the applied liquid are evaporated out, leaving only the oil (and molybdenum disulphide), dispersed in the micropores 2 and 5.

It should be noted that the direct anodization described in connection with FIG. 1 is essentially restricted to metallic friction surfaces, such as aluminum, and alloys thereof, and other metals and alloys, whereas the process described in connection with FIG. 2 can be used generally with any friction surface material which can be plated with a metal, such as for example lead, tin or cadmium plating. With the metal plated workpiece 1 of FIG. 2 the micropores 5 are produced in the pulverulent coating 6 and plating layer 4, rather than in the workpiece 1 itself, as in the case of the embodiment represented by FIG. 1. If desired, the lubricant coating 6 can be renewed by removing a worn coating 6 and its associated plating layer 4, and repeating the previously described anodizing process.

We claim:

1. A lubricant coating for a friction surface of an object, which comprises a layer of metal plating adhered to the friction surface of the object, and an anodized layer of a pulverulent compound of the plating metal adherent to the exterior surface of said metal plating layer, both of said metal plating and pulverulent compound layers being microporous, said pulverulent compound layer being the lubricant for the friction surface.

2. The lubricant coating of claim 1 including an oily liquid lubricant dispersed in said microporous metal plating and pulverulent compound layers.

3. The lubricant coating of claim 1 including an oily liquid lubricant in admixture with molybdenum disulfide dispersed in said microporous metal plating and pulverulent compound layers.

4. The lubricant coating of claim 1 wherein the plating metal is a member of the group consisting of lead, cadmium and tin.

5. A piston having a friction surface lubricant coating according to claim 2.

6. The piston of claim 5 wherein the friction surface lubricant coating comprising a plating layer of lead, and a pulverulent lead compound layer.

References Cited

UNITED STATES PATENTS

| | | | |
|---|---|---|---|
| 1,526,127 | 2/1925 | Flick | 308—241 X |
| 1,856,272 | 5/1932 | Summers | 308—237 X |
| 1,947,981 | 2/1934 | Fischer | 204—42 |
| 2,620,296 | 12/1952 | Wilsdon | 204—35 |
| 2,704,234 | 3/1955 | Love | 308—241 X |
| 2,760,925 | 8/1956 | Bryant | 308—241 X |
| 2,773,817 | 8/1956 | Russell | 204—38 |
| 2,898,490 | 8/1959 | Damon | 204—42 X |
| 2,927,886 | 3/1960 | Allen | 204—42 X |
| 2,999,798 | 9/1961 | Essfingen | 204—42 X |
| 3,123,412 | 3/1964 | Takao | 308—237 X |
| 3,150,016 | 9/1964 | Gillette | 204—35 X |
| 3,151,948 | 10/1964 | Steeves | 204—38.1 X |
| 3,273,944 | 9/1966 | Hammon | 308—241 X |

FOREIGN PATENTS

| | | |
|---|---|---|
| 589,105 | 9/1955 | Canada. |
| 512,125 | 8/1939 | Great Britain. |
| 602,404 | 5/1948 | Great Britain. |
| 696,074 | 8/1953 | Great Britain. |
| 1,565 | 5/1962 | Japan. |

MARTIN P. SCHWADRON, *Primary Examiner.*

L. L. JOHNSON, *Assistant Examiner.*

U.S. Cl. X.R.

204—23, 35, 42, 56; 308—241